INVENTORS,
E. R. ALTWICKER
R. E. GIBBS
N. P. KOLAK

BY Sherman & Shalloway
ATTORNEYS

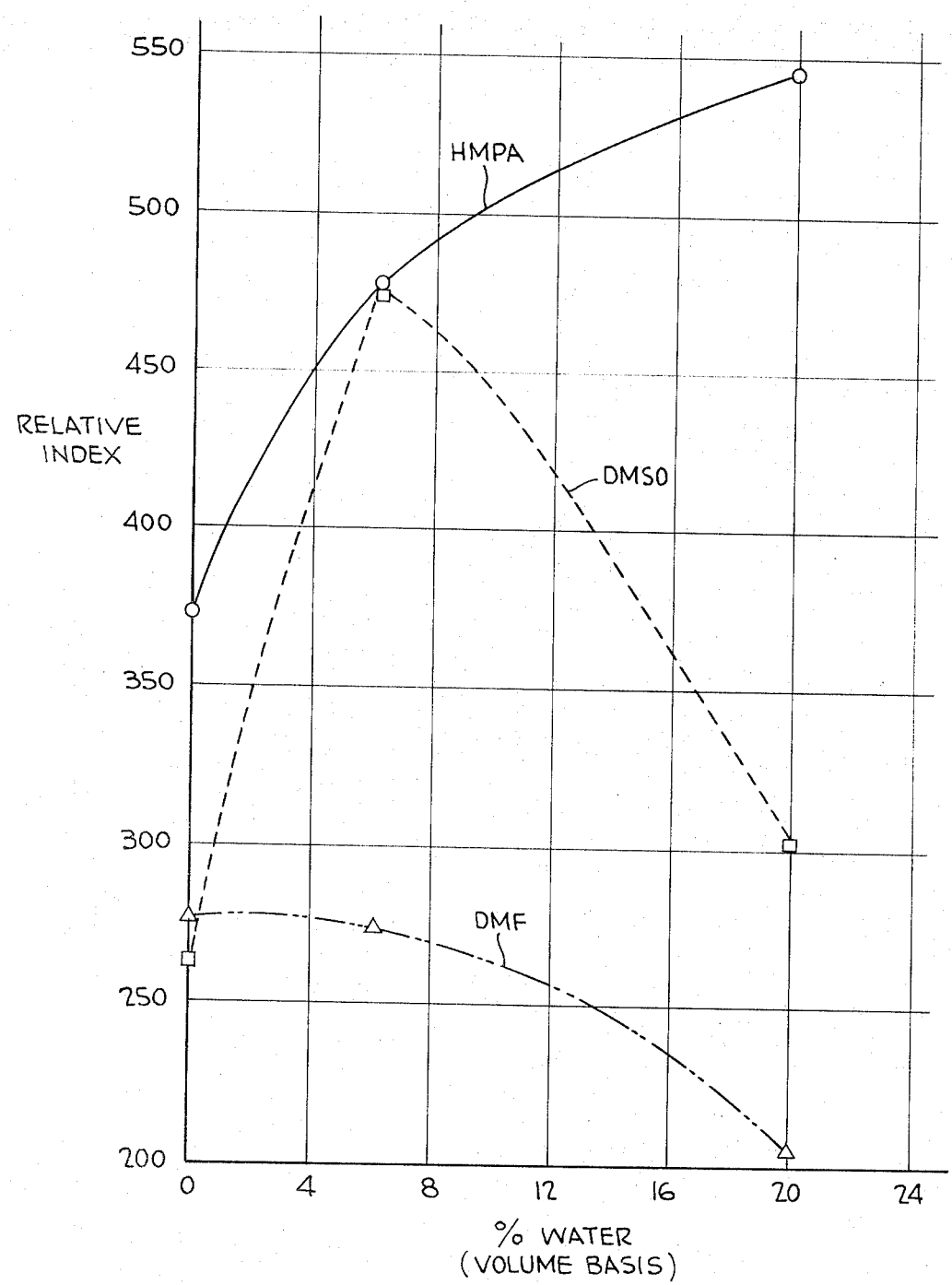

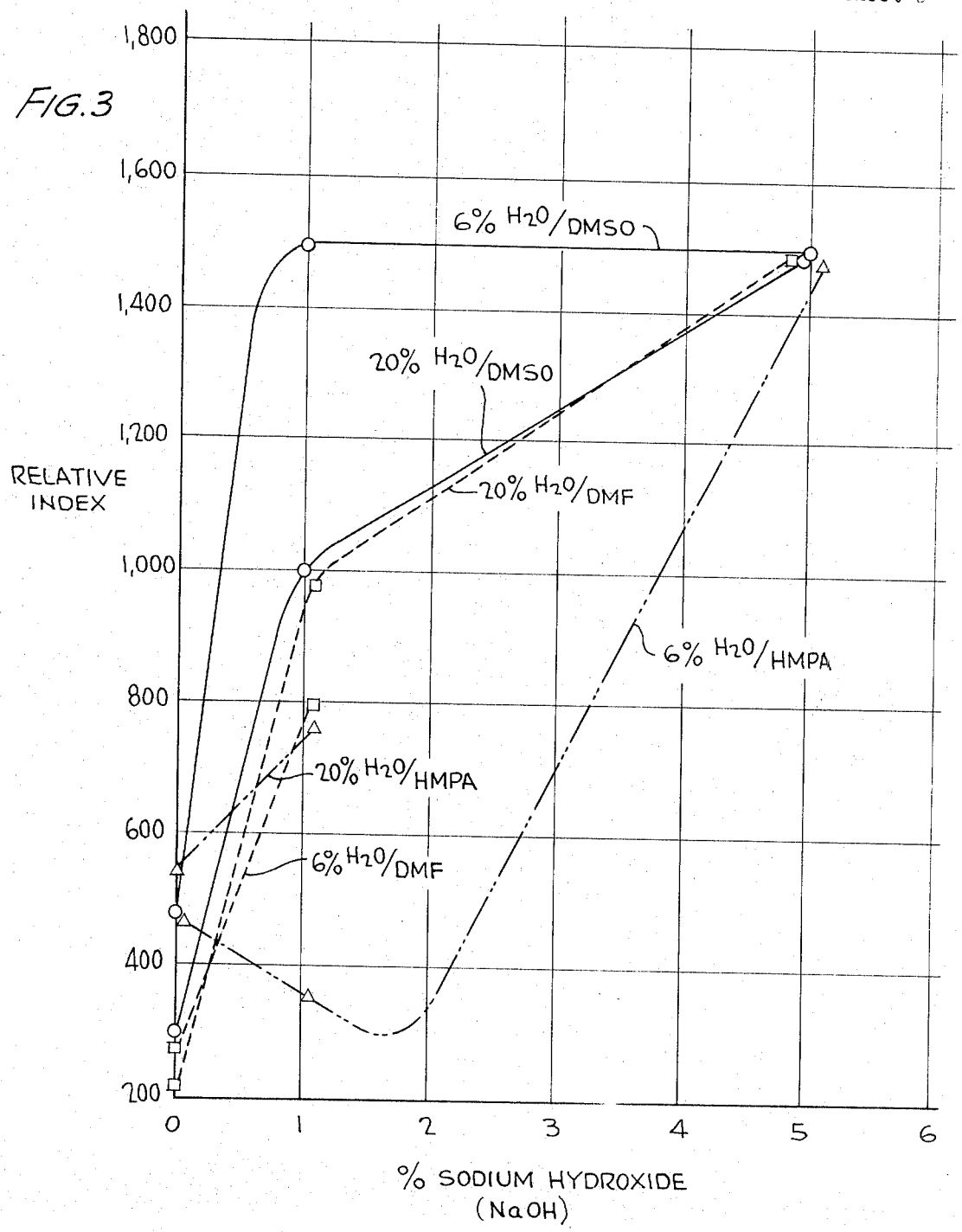

United States Patent Office 3,784,478
Patented Jan. 8, 1974

3,784,478
CONTROL OF NITROGEN OXIDES FROM
COMBUSTION PROCESS EFFLUENTS
Elmar R. Altwicker, Elnora, and Richard E. Gibbs and
Nicholas P. Kolak, Troy, N.Y., assignors to Argo Research International, Ltd., New York, N.Y.
Filed Sept. 7, 1971, Ser. No. 178,305
Int. Cl. B01d 47/02; C09k 3/00
U.S. Cl. 252—192                                6 Claims

ABSTRACT OF THE DISCLOSURE

A process for the removal of nitrogen containing compounds from a gas containing a mixture of the same comprising contacting the gas with a composition comprising an electron donor compound, water, and an alkali compound.

---

This invention relates to a process for the removal of nitrogen oxides from the effluents of combustion processes. More particularly, this invention relates to a process for removal of nitrogen oxides from the gaseous effluents of combustion processes utilizing gas-liquid absorption.

As a result of recent concern and regulations regarding air pollution, many attempts have been made to reduce the amount of nitrogen oxides which enter the atmosphere. However, in spite of these attempts, it is estimated that over 20 million tons of nitrogen oxides are emitted to the atmosphere in the United States every year. Of this amount, over half is due to stationary sources such as electric power plants, industrial combustion or gas plants. In these combustion processes, the nitrogen present in the air combines with the oxygen to produce varying amounts of nitrogen oxides, including nitric oxide and nitrogen dioxide.

The continued emission of these nitrogen oxides into the air is of grave national concern since it has been shown that even low levels of these oxides in the air have detrimental effects on health. Natural background levels of 1 part per billion have been supplemented with an average urban level of 10–50 parts per hundred million. Since stack gas from typical stationary combustion sources, as noted above, contains from 100–200 parts per million of nitrogen oxides, efforts must be made to reduce the level of nitrogen oxide emissions from these combustion processes which are necessary to our daily national existence. Furthermore, the nitrogen oxide pollutants react with other pollutants, such as sulphur oxides and hydrocarbons, in the atmosphere to form the now common smog of the larger industrial centers. Although smog was once only a problem of the largest and most densely populated national urban centers, the general background level has been raised sufficiently in past years that it is becoming a problem even in areas of the country which are not industrially developed.

Although there are other sources for the production of energy and power which can eventually replace fossil fuel power stations, it is estimated that it will be a number of decades before these power sources can be economically used and that until that time at least 100 and possibly 300 new fossil fuel combustion stations will be built for the generation of electricity alone. Therefore, it is vitally important that a method be developed for controlling nitrogen oxide pollutants from present sources of combustion power and fossil fuel power stations which will be built in the next 20 years. This fact alone has given increased impetus to the research surrounding the elimination of nitrogen oxides from power plants and other combustion process emissions.

There are two general approaches for the elimination of nitrogen oxide emissions from power plant stack gases. One approach is to modify the combustion process so that nitrogen oxides are not produced in sufficient quantities to cause harm. However, this approach is not practical with respect to the numerous power stations which are already in operation since these modifications would require extensive capital improvements and other changes which would make cost of such procedures prohibitive. The second alternative is to remove these nitrogen oxide pollutants from the exit streams of the combustion zones. This second alternative is, by far, the most practical commercially since a process for the removal of nitrogen oxides can be adapted to any existing power plant with a minimum of expense and capital improvement. With regard to the second method, namely, the removal of the nitrogen oxide pollutants from the exit streams of these power sources, a number of possible methods for the removal have been proposed: the use of a reducing gas to reduce nitrogen oxides to nitrogen; the use of gas permeable membranes which are selective for the specific pollutant; the use of an electric arc which, when passed through an atmosphere of nitrogen produces atomic nitrogen which would react with the nitrogen oxides to produce nitrogen and oxygen; the use of various complexing agents which form complex ions with the nitrogen oxides in the flue gas; the use of solid absorbants which absorb the nitrogen oxides from the flue gas; the use of a catalyst with or without a reducing agent; and, finally, the use of a liquid solution to absorb the nitrogen oxides from the flue gas.

The use of solid absorption to remove nitrogen oxides from flue gases is not a new idea since well known processes for the production of nitric acid rely on the absorption of nitrogen oxides on silica gel. However, although these solids are active and remove the majority of the nitrogen oxides from the flue gases, they are often poisoned by other pollutants and also are easily saturated when the nitrogen oxides are present in excess of 1000 parts per million in the gas stream.

A major effort toward abatement of nitrogen oxide pollution has been concentrated in the area of the use of various liquid solutions to remove the nitrogen oxides from flue gases. In U.S. Pats. 3,044,844 and 3,044,853, a process is disclosed for the removal of nitrogen oxides from gases containing the same utilizing a mixture of an electron donor compound and from 2–25% water. Although the process disclosed in the above two patents have generally been somewhat successful since these processes remove a significant portion of the nitrogen oxides present in flue gases, it has been found that the results which are obtained utilizing these processes can be immensely improved using the process of the present invention.

Briefly, the process of the present invention comprises an improvement over the processes disclosed in the above noted U.S. patents and utilizes, as the liquid absorbant, a composition containing an electron donor compound, water, and an alkali compound, such as sodium hydroxide. It has been found that compositions containing the above three classes of compounds have immensely improved absorption characteristics for the nitrogen oxides present in the effluent streams than either the water-electron donor system or the water-alkali system. It has, therefore, been found that the combination of the electron donor, water, and the alkali compound produces a synergistic effect for the absorption of nitrogen oxide pollutants present in stack gases.

It is, therefore, the principle object of the present invention to provide an improved process for the removal of nitrogen oxides from flue gases.

It is a further object of the present invention to provide an improved process for the removal of nitrogen oxides from flue gases using gas-liquid absorption.

It is a still further object of the present invention to provide an improved process for the removal of nitrogen oxides from flue gases using a liquid absorption composition comprising an electron donor, water, and an alkali compound.

It is a still further object of the present invention to provide a process for removing nitrogen oxides from flue gases from stationary combustion sources.

It is a still further object of the present invention to provide a gas-liquid absorption composition for removing nitrogen oxides from flue gases.

It is a still further object of the present invention to provide an efficient method for removing nitrogen oxides from stationary combustion sources which can be economically adapted to presently existing units.

Further objects and advantages of the process of the present invention will become more apparent from the following, more detailed description thereof.

The process of the present invention comprises an improved process for the separation of nitrogen oxides such as nitrous oxide, nitric oxide, nitrogen dioxide, nitrogen trioxide, nitrogen tetroxide, and nitrogen pentoxide from flue and stack gases from stationary combustion processes and other similar processes comprising contacting these nitrogen oxide containing flue gases with a composition comprising an electron donor compound, an alkali compound, and water, as a selective absorption agent for the nitrogen containing compounds.

The absorption efficiency of the process of the present invention is higher than that of prior art processes employing alkali materials and water or organic electron donor type solvents and water. The process of the present invention utilizes the three component system which has increased efficiency over processes utilizing only one of the above noted absorbents or any combination of two of the compounds comprising the composition useful in the process of the present invention.

The high efficiency of the process of the present invention appears attributable to the fact that the nitrogen oxide pollutants are generally electron deficient compounds possessing electron deficient orbitals. As shown in U.S. Pats. 3,044,844 and 3,044,853, the electron donor compounds suitable for use in the process of the present invention supply an electron pair to the nitrogen oxide compounds to form a complex. It is thought that the addition of the alkali compound to the water miscible organic electron donor solvents then reacts with the solvent-nitrogen oxide complex to form inorganic salts and regenerated solvent. The equilibrium is continually shifted away from the gas-liquid interface. Although it appears that it is this continued equilibrium displacement in the direction of the inorganic ions (nitrites and nitrates) which provides the superior results of the process of the present invention, an increase in the rates of reaction following absorption of the gases is also believed to occur. However, the present invention should not be limited to any specific mechanism. Furthermore the nitrogen compounds can be removed from this complex solution by conversion of the nitrogen oxides into inorganic salts so as to continually displace the equilibrium toward the formation of the complex electron donor-nitrogen oxide compounds and, finally, to the inorganic salts.

Suitable electron donor solvents, which may be employed in the process of the present invention include trialkyl phosphates, e.g., tributyl phosphate, triethyl phosphate, and tri-2-ethylhexyl phosphate; dialkyl acid phosphates, e.g., diethyl acid phosphate and dilauryl acid phosphate; mixed dialkyl, monoalkyl phosphates, e.g., the mixture of mono- and di-lauryl acid phosphates; triaryl phosphates, e.g., triphenyl phosphate, tricresyl phosphate; diaryl, monoaryl and mixed mono- and diaryl phosphates, e.g., mixtures of mono- and di-phenyl acid phosphates; nitriles, e.g., benzonitrile, stearyl nitrile, adiponitrile; amides, e.g., dimethylformamide, dimethylbenzamide, methyl nonamide; ethers, preferably cyclic ethers and ethers containing more than one ether linkage, e.g., dioxane, tetrahydrofuran, triethyleneglycol dimethyl ether, ethylene glycol dimethyl ether, and Carbowax (trade name for a number of polyethylene glycol ethers of various molecular weights); sulfoxides, e.g., dimethylsulfoxide and diethylsulfoxide; certain acetals, e.g., dimethyl acetal; compounds containing two or more of the functional groups mentioned above such as hexeamehyl phosphoramide, ethyl ether of 2-hydroxy-acetonitrile; organic acids, e.g., acetic acid; esters of organic acids, e.g., ethyl acetate; and certain ketones and aldehydes.

As stated above, the electron donor compounds employed in the practice of the present invention are those which are reactive with the nitrogen oxide compounds only to the extent that they share electrons with the nitrogen oxide compounds and function as a selective solvent.

Although any of the above noted electron donor organic solvents may be used in the process of the present invention, the following electron donor organic solvents are preferred: hexamethylphosphoramide, dimethylformamide, and dimethylsulfoxide.

The following alkali compounds are suitable for use as the alkali compound in the process of the present invention: alkali, alkaline earth or ammonium hydroxides, oxides, carbonates, etc. Although any of the above noted alkali compounds may be used, the alkali hydroxides and ammonium hydroxides are preferred for use in the process of the present invention.

The gas-liquid absorption composition of the present invention comprises a mixture of about 65–98 weight percent of a partially water miscible electron donor compound, about 1–25 weight percent of water and about 0.001–10 weight percent of an alkali compound. Generally, the preferred composition contains from about 75–94% by weight electron donor compound, about 4–20% by weight water, and about 0.1–6% by weight alkali compound.

The gas-liquid absorption composition of the present invention has excellent absorption characteristics for most nitrogen oxides normally found in flue gases from stationary combustion sources such as nitrous oxide, nitric oxide, nitrogen dioxide, nitrogen trioxide, nitrogen tetraoxide, and nitrogen pentoxide.

While the process of the present invention is not particularly temperature dependent, it has been found, and is a preferred embodiment of the present invention, that maximum efficiency occurs when the contacting temperatures are within the range of from 0–250° C. Since stack and flue gases are generally at elevated temperatures, a minimum of heat transfer apparatus is necessary to keep the temperature within the above noted range.

Further, in view of the excellent efficiency of the process of the present invention, various liquid-gas contacting apparatus may be used such as packed absorption columns operating either counter-, crossflow-, or co-currently, plate columns with or without bubble caps or similar diffusion apparatus, etc. Generally, the type of contacting apparatus chosen will depend on numerous individual factors such as, through-put, pressure drop, etc.

The process of the present invention will now be more fully described by reference to the drawings wherein:

FIG. 2 is a diagram illustrating the effect of increasing water concentration on the nitrogen oxide absorption of the electron donor organic solvents as disclosed in U.S. Pats. 3,044,844 and 3,044,853; and FIG. 3 is a diagram illustrating the enhancement in nitrogen oxide absorption by electron donor organic solvent-water compositions as a function of alkali compound concentration.

Figure 1:
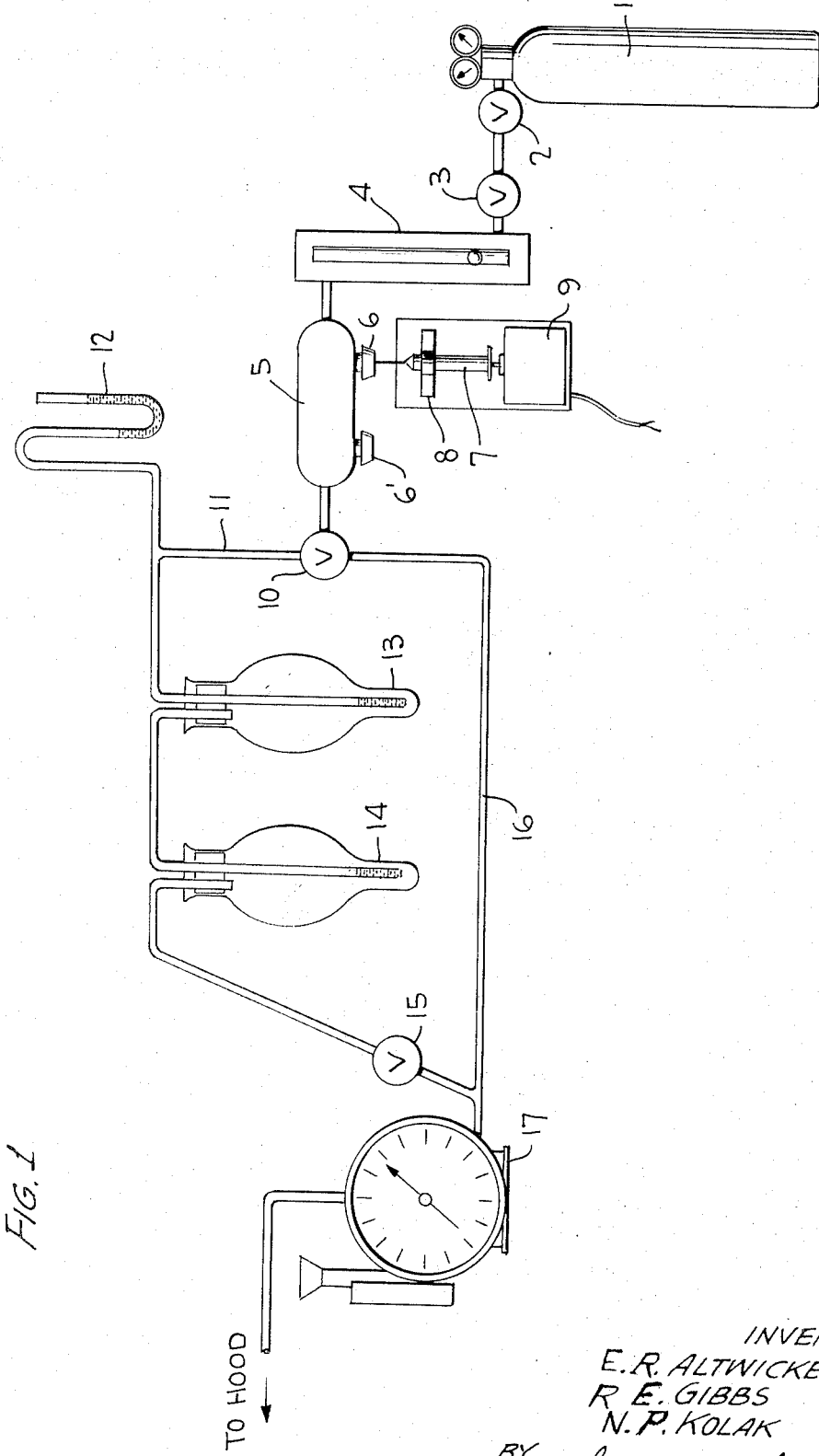
FIG. 1 is a schematic diagram of laboratory test apparatus for testing the efficiency of the process of the present invention and prior art processes.

FIG. 1 is a diagrammatic illustration of a modified Saltzman testing apparatus for testing the effectiveness of the various absorbances for the removal of nitrogen oxides from combustion process stack gases. This apparatus simulates the nitrogen and nitrogen oxide content of flue gases by introducing a specific quantity of nitrogen delivered from nitrogen tank 1 through control valves 2 and 3 and through flow meter 4 into mixing chamber 5. Mixing chamber 5 also has a number of membranes 6 and 6' through which measured quantities of various nitrogen oxides, such as nitric oxide and nitrogen dioxide, may be introduced into mixing chamber 5. These nitrogen oxides are introduced into mixing chamber 5 by means of at least one syringe 7 mounted in syringe holder 8 having a controlled syringe pump 9 integral therewith. By controlling the rate of flow of pure nitrogen from tank 1 and the nitrogen oxides from syringes 7, a gaseous mixture containing a specific amount of nitrogen oxide may be introduced into mixing chamber 5. From mixing chamber 5, the gases pass through valve 10 into line 16, which, when valve 15 is closed, flows directly to a wet test meter 17. Valve 10 is opened to line 11 and valve 15 is also opened so that the mixed gases from chamber 5 flow through valve 10 into line 11 and into a series of bubblers 13 and 14. A manometer 12 is also attached to line 11 to monitor pressure drop. The absorption solution to be tested, i.e., plain water, alkali material, electron donor compounds, either singly or in mixtures, are placed within the first bubbler 13. The second bubbler 14 contains the Saltzman reagent which is an aqueous solution prepared by dissolving 5.2 grams of sulfanilic acid monohydrate in 900 mls. of a mixture of distilled water containing 140 mls. of glacial acetic acid. Into this sulfanilic acid-glacial acetic acid-water solution is added 20 mls. of a 0.1% aqueous solution of N-(1-naphthyl)-ethylenediamine dihydrochloride followed by adding sufficient distilled water to make exactly 1 liter.

A full discussion of the use and parameters of the Saltzman method is disclosed in Analytic Chemistry, vol. 26, pages 1949–1955, December 1949.

The Saltzman reagent is a colorimetric indicator and turns pink when exposed to sufficient nitrogen dioxide. The mixed gas is bubbled through the test solution in fritted bubbler 13 until the Saltzman reagent turns pink to the eye, at which time the procedure is stopped and the amount of nitrogen oxide fed through the absorber is calculated from the various flow rates. Furthermore, the amount of nitrogen oxide absorbed by the test medium can be calculated by subtracting the amount of nitrogen dioxides fed into the test apparatus and the amount required to produce an indication by the Saltzman reagent. By dividing the amount absorbed (parts per million $NO_2$) by the test solution by the amount entering (parts per million $NO_2$) a relative efficiency which represents the amount of nitrogen oxides removed by the absorbing solution over a period of time can be determined. The efficiency, however, does not include a time element since it has been found that two different test solutions give rise to a similar efficiency but the time length for either sample could differ considerably. Therefore, the time factor in minutes and the efficiency expressed in percent for the system is inherently given with the relative index which is plotted against the solution variables as shown in FIGS. 2 and 3.

The relative index values are directly proportional to the performance of the absorption system, i.e., the larger the index number the better is the performance of the system for controlling nitrogen oxides. Furthermore, the relation of the performance of pure water, the pure organic electron donor solvents, and the Saltzman reagent is also evident from FIG. 2 and 3.

The process of the present invention will now be illustrated by the following examples, which are not to be taken as limiting and wherein all parts and percentages are by weight.

COMPARATIVE EXAMPLE 1

Using the apparatus as shown in FIG. 1, the following absorption samples are contacted with a mixture of nitrogen, nitric oxide, and nitrogen dioxide:

(a) 100% dimethylformamide;
(b) 94% dimethylformamide, 6% water;
(c) 80% dimethylformamide, 20% water;
(d) 100% dimethylsulfoxide;
(e) 94% dimethylsulfoxide, 6% water;
(f) 80% dimethylsulfoxide, 20% water;
(g) 100% hexamethylphosphoramide;
(h) 94% hexamethylphosphoramide, 6% water; and
(i) 80% hexamethylphosphoramide, 20% water.

The relative efficiencies of the above compositions as absorbing agents for nitrogen oxides is plotted in FIG. 2.

FIG. 2 illustrates the effect of an increase in water concentration in the test solution and shows the difference in the nitrogen oxide absorption for the various organic solvents and the relationship of water concentration and absorption. As noted from this figure, the additon of water lowers the capacity for the dimethylformamide (DMF) to absorb nitrogen oxides while the hexamethylphosphoramide (HMPA) efficiency is significantly increased with water concentration. For the dimethylsulfoxide (DMSO), the maximum relative index (i.e., absorption) occurs at 6% water. All the data in FIG. 2 is obtained in the absence of any alkali compound whatever.

EXAMPLE 1

Using the test apparatus shown in FIG. 1, the following absorption compositions are contacted with a mixture of nitrogen, nitric oxide, and nitrogen dioxide:

(a) 3 ml. of 1% aqueous sodium hydroxide are diluted to 50 ml. of solution with HMPA;
(b) 3 ml. of 5% aqueous sodium hydroxide are diluted to 50 ml. of solution with HMPA;
(c) 10 ml. of 1% aqueous sodium hydroxide are diluted to 50 ml. of solution with HMPA;
(d) 3 ml. of 1% aqueous sodium hydroxide are diluted to 50 ml. of solution with DMF;
(e) 10 ml. of 1% aqueous sodium hydroxide are diluted to 50 ml. of solution with DMF;
(f) 10 ml. of 5% aqueous sodium hydroxide are diluted to 50 ml. of solution with DMF;
(g) 3 ml. of 1% aqueous sodium hydroxide are diluted to 50 ml. of solution with DMSO;
(h) 3 ml. of 5% aqueous sodium hydroxide are diluted to 50 ml. of solution with DMSO;
(i) 10 ml. of 1% aqueous sodium hydroxide are diluted to 50 ml. of solution with DMSO; and
(j) 10 ml. of 5% aqueous sodium hydroxide are diluted to 50 ml. of solution with DMSO.

The relative efficiencies of the above compositions as absorbing agents for nitrogen oxides as well as the compositions containing the solvent and either 6 or 20% water are plotted on FIG. 3.

FIG. 3 shows the relationship of the various water solutions of organic electron donor solvents as absorbants for nitrogen oxides and the effects of the variation of the amount of alkali contained in the solution. As is readily evident, the increase obtained utilizing even a small percentage of alkali with respect to some of these solutions of water and organic solvent is remarkable, i.e., in the case of the 6% water and 94% dimethylsulfoxide, addition of sodium hydroxide increases the relative index, and therefore the absorption capacity of the absorbant, from about 450 up to 1500, an increase of approximately 330%. Similar increases are also shown for some solutions of dimethylsulfoxide containing 20% water, solutions of dimethylformamide containing 6% water, and the solutions of hexamethylphosphoramide containing 20% water. Although the solution of hexamethylphosphoramide containing 6% water initially showed a decrease in absorption down to a low point in solutions containing only a small amount of sodium hydroxide, these solutions increased from this low point up to approximately the same relative index., i.e., 1500, at higher sodium hydroxide concentrations. As noted with all three of the above noted solvents, the alkali material served to enhance the effectiveness of the absorption material using aqueous 5% sodium hydroxide by increases of absorption of from 300–3500%.

EXAMPLE 2

In order to determine whether or not the relative index is concentration dependent, an attempt is made to saturate the absorbing solution and the concentration of the nitrogen oxides entering the system is doubled from 25 parts per million to 50 parts per million. This increased concentration of nitrogen oxide is absorbed on the following three systems.

| Solvent | Percent Water | Sodium hydroxide |
|---------|---------------|------------------|
| DMSO    | 6             | 1                |
| DMSO    | 20            | 5                |
| DMF     | 20            | 5                |

The relative indices at 50 parts per million nitrogen dioxide are quite high, approximately 1500 in each case, practically identical with the absorption efficiencies of the same solutions operated at 25 parts per million of nitrogen oxides. From this data it appears that the relative index is virtually insensitive to the entering concentration of the nitrogen oxides. Furthermore, it should be noted at this point that the doubled nitrogen oxide concentration did not saturate the absorbing solution and it appears that, although no attempt has been made to determine the saturation point of these absorbing solutions, these solutions appear to have a very high efficiency and are capable of absorbing great quantities of nitrogen oxide pollutants for a relatively extended period of time.

EXAMPLE 3

The following organic electron donor solvents are tested using the apparatus as shown in FIG. 1:

(a) triphenyl phosphate
(b) dioxane, tetrahydrofuran
(c) Carbowax
(d) acetic acid
(e) benzonitrile
(f) diethyl acid phosphate Similar relative indices were observed with the range varying from 1000–1400 when from 0.001–5% aqueous alkali was used. When the same materials were tested without alkali, the indices were from 250–400.

EXAMPLE 4

The following compositions are tested using the apparatus shown in FIG. 1:

(a) 2.5 ml. of 1% aqueous potassium hydroxide are diluted to 50 ml. solution with DMF;
(b) 9.5 ml. of 1% aqueous potassium hydroxide are diluted to 50 ml. solution with DMF;
(c) 3 ml. of 1% aqueous ammonium hydroxide are diluted to 50 ml. solution with DMSO,
(d) 7.5 ml. of 6% aqueous ammonium hydroxide are diluted to 50 ml. solution with DMSO;
(e) 2.5 ml. of 1% aqueous sodium carbonate are diluted to 50 ml. solution with DMF;
(f) 2.5 ml. of 1% aqueous calcium hydroxide are diluted to 50 ml. solution with DMSO;
(g) 3 ml. of 5% aqueous calcium hydroxide are diluted to 50 ml. solution with HMPA;
(h) 10 ml. of 1% aqueous ammonium carbonate are diluted to 50 ml. solution with DMF;
(i) 10 ml. of 1% aqueous potassium oxide are diluted to 50 ml. solution with DMF;
(j) 3 ml. of 9% aqueous sodium hydroxide are diluted to 50 ml. solution with DMSO; and
(k) 10 ml. of 10% aqueous potassium oxide are diluted to 50 ml. solution with DMF.

Each of the above compositions exhibits a relative index within the range of from 900–1400.

While the process of the present invention has been described by way of the foregoing general examples, the discussion of these results is for the purpose of illustration only and is in no way to limit the scope of the present invention which is properly defined by the appended claims.

We claim:

1. A composition for the removal of nitrogen oxides from flue gases consisting essentially of an electron donor compound selected from glycol ethers, alkyl sulfoxides, alkyl phosphates, aryl phosphates, dialkylamides, or alkyl phosphoramides, from about 1 to about 30 weight percent water and from about 0.001 to about 10 weight percent of the aqueous phase of a compound selected from alkali hydroxides, oxides and carbonates, alkaline earth hydroxides, oxides and carbonates, and alkylammonium hydroxides, oxides and carbonates.

2. The composition of claim 1 wherein said donor compound is selected from dimethylformamide, hexamethylphosphoramide, and dimethylsulfoxide.

3. The composition of claim 1 wherein said compound is selected from sodium hydroxide and potassium hydroxide.

4. The composition of claim 2 wherein said compound is selected from sodium hydroxide and potassium hydroxide.

5. The composition of claim 1 wherein water is present from about 4 to about 20 weight percent and said compound is present from about 0.001 to about 6 weight percent of the aqueous phase.

6. The composition of claim 5 wherein water is present from about 4 to about 20 weight percent and said compound is present from about 0.001 to about 6 weight percent of the aqueous phase.

References Cited

UNITED STATES PATENTS

| 2,948,683 | 8/1960  | Sullivan et al. | 252—Dig. 4 |
| 3,044,844 | 7/1962  | Maury et al.    | 252—Dig. 4 |
| 2,445,064 | 7/1948  | Hall et al.     | 252—192    |
| 2,718,454 | 9/1955  | Wylie           | 252—192    |
| 2,818,388 | 12/1957 | Sullivan et al. | 252—Dig. 4 |
| 2,983,685 | 5/1961  | Harbin          | 252—192    |
| 3,382,033 | 5/1968  | Kilagawg        | 423—239    |
| 3,044,852 | 7/1962  | Maury et al.    | 252—Dig. 4 |

FOREIGN PATENTS

| 1,916,271 | 10/1970 | Germany | 55—68 |

LEON D. ROSDOL, Primary Examiner

I. GLUCK, Assistant Examiner

U.S. Cl. X.R.

55—68, 244; 423—235, 239